3,157,240
TILT HOOD TRACTOR CONSTRUCTION
Norman B. Chew, Portland, Oreg., assignor to Freightliner Corporation, Portland, Oreg., a corporation of Delaware
Filed Dec. 1, 1961, Ser. No. 156,281
9 Claims. (Cl. 180—69)

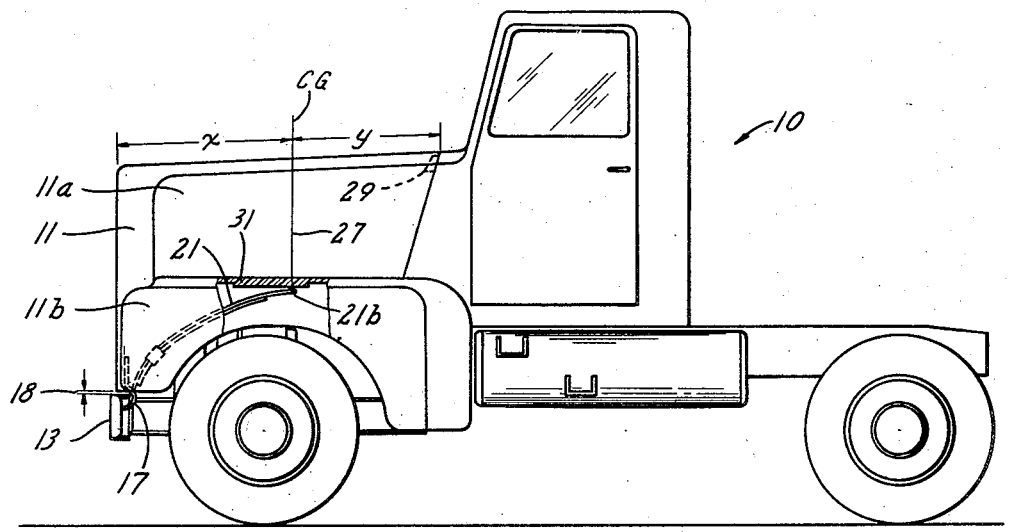
FIG_1_
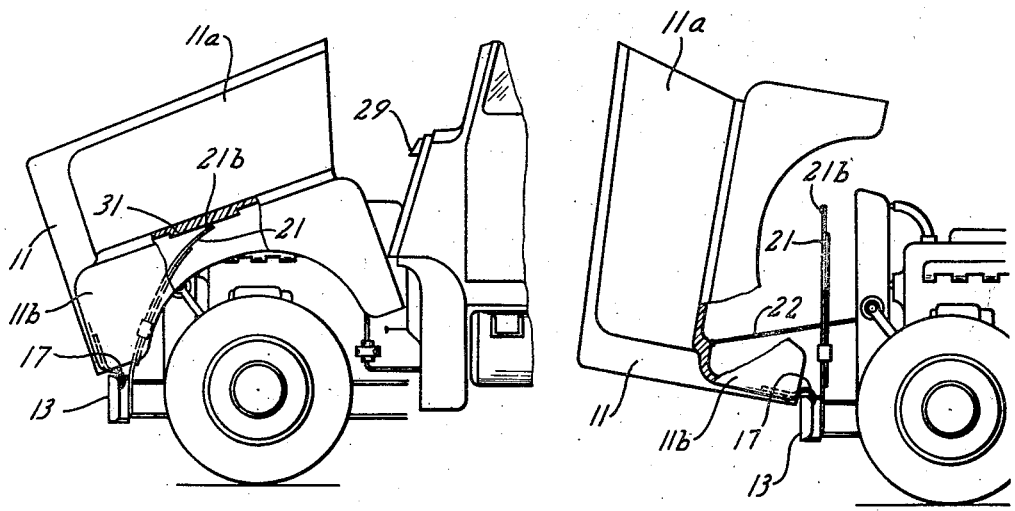
FIG_2_
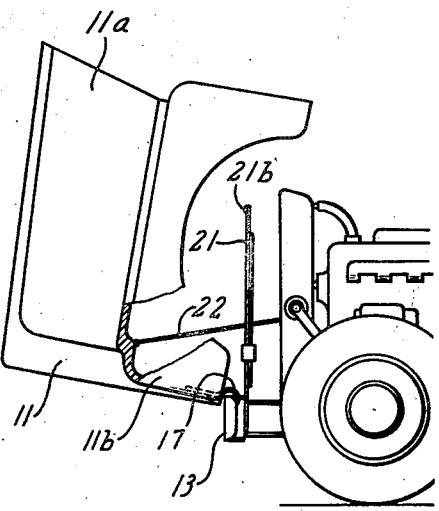
FIG_3_
INVENTOR.
Norman B. Chew
BY
ATTORNEYS

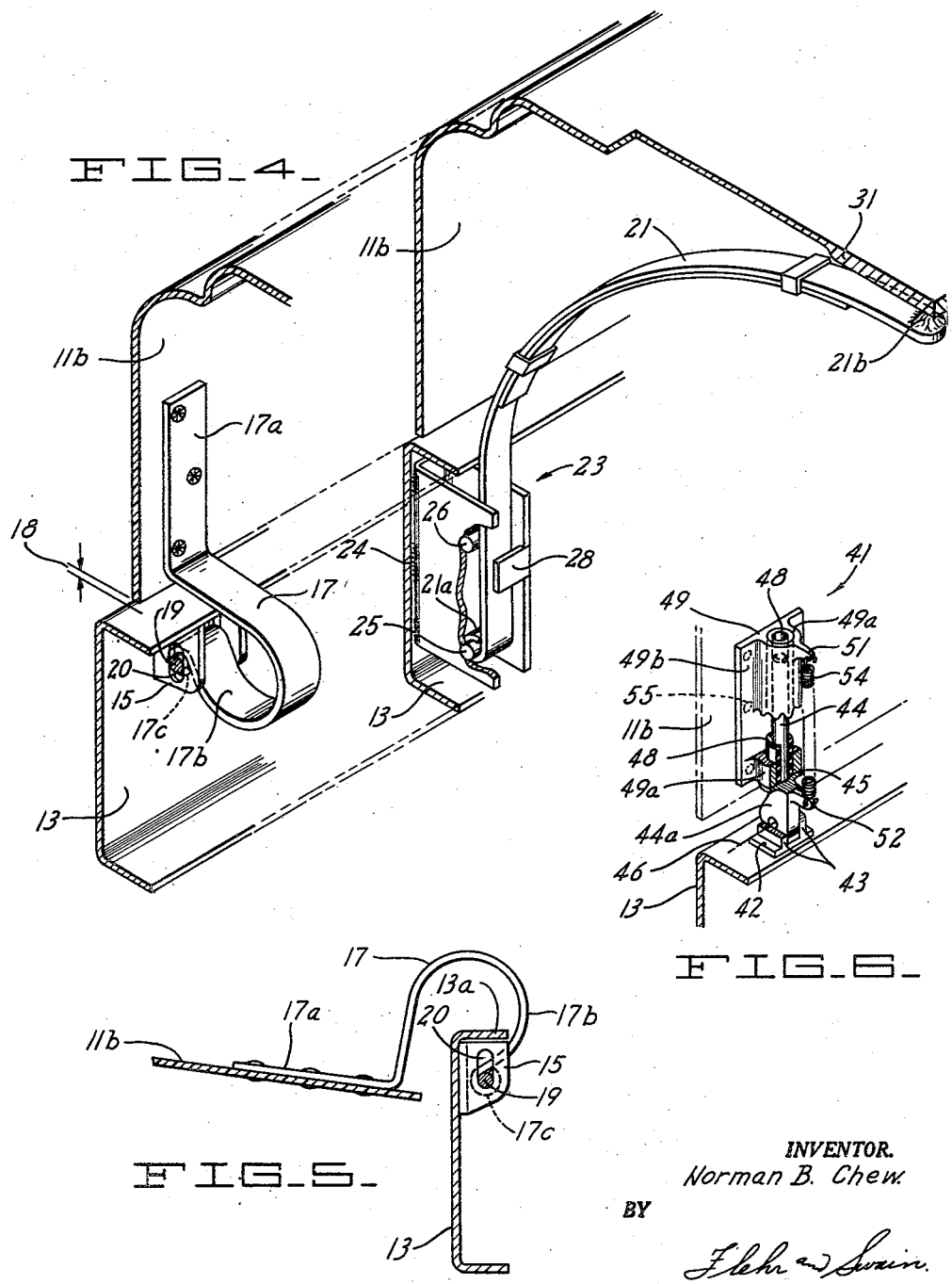

This invention relates to automotive vehicles utilizing a tilting hood or cab construction and more particularly to such a construction including an improved support therefor.

In tilt hood and cab constructions it is very desirable to minimize the weight of the material used. This has a number of advantages, the more obvious of which include an increase in the horsepower per pound of the vehicle as well as the facility with which a single man can expose the engine for inspection or servicing. Another advantage in using light weight materials such as glass fiber or plastics is the reduction of bulk found in the structure supporting the hood member, particularly including the forward hinges.

In using lightweight materials as above, however, it has been found that they usually will not withstand high load concentrations at their mounting points such as at the hood tilt mounts or hinge members. Load concentrations at these points are aggravated particularly by the bouncing and vibration encountered in driving.

In the present invention a hood member has been incorporated which relieves the tilt mounts and the rear cowl mounts from a great deal of the weight of the hood member and ideally relieves virtually all of the weight therefrom so that the hood "floats" substantially free from its mounts. In addition to relieving this weight to provide the above advantages, the support member also assists a person to open the hood by contributing a biasing force thereto.

Thus, it is an object of the present invention to provide a tilt hood construction wherein the hood member is supported to relieve the weight of the hood member from its supporting structure.

Another object of the invention is the provision of a lightweight hood member, such as of plastic or glass fiber supported in a substantial "floating" condition with respect to its mounting.

Still another object of the invention is the elimination of high load concentrations upon a hood member through a supporting structure which also functions to assist in tilting the hood member to expose the interior of the vehicle.

Other objects and advantages will be apparent from the following description of the invention.

In the drawings:

FIGURE 1 is a side elevation view of a truck in partial section showing the hood and fender construction in its closed condition.

FIGURE 2 is a side elevation of a portion of the truck of FIGURE 1 showing an intermediate stage of opening of the hood and fender portion thereof.

FIGURE 3 shows the hood in its fully opened condition.

FIGURE 4 is a perspective view of the underside of one of the fenders of the truck shown in FIGURE 1.

FIGURE 5 is a detail of the hinge means shown in its fully opened condition.

FIGURE 6 shows an alternative hinge.

Referring to FIGURE 1 there is shown a truck 10 having a body portion generally designated 11. Portion 11 includes a hood member 11a formed integrally with fenders 11b and which can be molded for example from light weight plastic material such as glass fiber. Truck 10 includes a front bumper 13 best shown in FIGURE 4. A bracket 15 welded to bumper 13 supports a hinge member 17 formed in the shape of an inverted question mark consisting of a stem 17a and crook portion 17b terminating in a circular portion 17c wrapped outwardly of hinge 17. A pin 19 extends through slots 20 in the sides of bracket 15 and is free to move vertically therein. Pin 19 passes through the center of circular portion 17c to provide a pivot point around which member 17 can be rotated. Stem 17a is riveted to the vertical front portion of fender 11b, and the bottom edge of fender 11b is spaced slightly from bumper 13 as shown best in FIGURE 1 at 18 enough to clear bumper 13 as body portion 11 is opened forwardly. A similar hinge is provided on the opposite side of truck 10.

Member 17 are made of material with sufficient resilience to provide a limited degree of spring action to the mounting. As shown best in FIGURE 5, it can be seen that when the hood member 11 is tilted forward, crook portion 17b reaches a stop position as shown in FIGURE 3 by contacting the upper edge 13a of bumper 13 so as to hold member 11 substantially upright and clear of the engine portion of truck 10. However, hinges 17 are not permitted to turn this far and this feature only provides a safety stop in the event of failure of a limiting cable 22 moored to hood member 11 and a fixed part of truck 10.

It can therefore be seen that with the resilient hinge mountings 17 free to reciprocate in slots 20, vibration encountered during driving of truck 10 will not cause the plastic hood member to beat against bumper 13. It will be observed, however, that hinge 17 is of minimal bulk.

Another hinge which has been found satisfactory is shown in FIGURE 6 which allows for a limited degree of alignment in closing the hood as well as also providing some vertical resiliency.

As there shown, hinge 41 includes a bracket 42 welded to the top of bumper 13 and including a pair of members 43. Between members 43 a hinge rod 44 formed with an eyelet portion 44a and a flange-like collar 45 is secured by a bolt (not shown) positioned on center line 46. A bushing 48 of suitable resilient material such as rubber is interposed between rod 44 and a hinge housing 49 which generally includes a cylindrical portion 49a and a pair of outwardly spread flange members 49b disposed to lie flat against the inner surface of fender portion 11b.

At the top of the back side of cylindrical portion 49a is a pad eye 51 formed integrally therewith and positioned in vertical alignment substantially with the pad eye 52 formed to the rear of eyelet portion 44a. Between pad eyes 51 and 52 a spring 54 is connected to apply a suitable biasing force therebetween. Hinge 41 is held to the inner face of fender portion 11b by any suitable means such as the rivets 55 shown in phantom lines in FIGURE 6.

As thus arranged, when hood member 11 is tilted forward, housing 49 moves longitudinally with respect to rod 44 as rod 44 pivots forward. The tension in spring 54 is selected so that "rebounding" of body portion 11 is minimized.

To enable the use of light weight supports such as hinge members 17, there has been provided inboard of hinges 17 and beneath each fender portion 11b a leaf spring 21. Spring 21 is supported from bumper 13 by a bracket 23 of general "U" shaped construction. Bracket 23 is secured to the back-side of bumper 13 as by welding 24. Bracket 23 is provided with a pair of pins 25 and 26 disposed in substantially vertical alignment with each other. The back edges of bracket 23 are held spaced apart by a plate 28 welded therebetween so as to lock spring 21 between pin 26 and plate 28. The lower end of spring 21 is provided with a circular portion 21a encircling pin 25. As thus arranged, and as shown in FIGURE 3, when spring 21 is unstressed it will stand substantially vertically from bracket 23 and hence completely out of the way for servicing the engine of truck 10.

Spring 21 extends rearwardly from bracket 23 when the hood is closed so that its distal end 21b terminates at a point lying substantially in a plane 27 transversely of truck 10 and through the center of gravity of hood member 11. Plane 27 is a distance "x" to the rear of the front of member 11 and a distance "y" forward of a cowl lock 29. Thus, spring 21 acts to lift member 11 off of its hinges 17. To the rear of hood member 11 there is provided conventional cowl lock 29. Therefore spring 21 acts upwardly substantially through the center of gravity of member 11 to relieve the weight of hood member 11 from hinges 17 and cowl lock 29 with a force susbtantially equal to the weight of member 11. In practice it has been found that spring 21 will lose some limited resiliency so that the bias force will thereafter be slightly less than the hood weight. By relieving the downward pressure of weight from hinges 17 and cowl lock 29 member 11 substantially "floats" free of its moorings. In this condition, lightweight material, such as glass fiber can successfully be used for hood and fender construction without disintegrating under vibration and stress of use.

As shown in FIGURES 2 and 3, as hood member 11 is opened distal end 21b moves in sliding contact with the under surface of portion 11b. A thickened pad 31 has been formed to absorb this wear and to reinforce fenders 11b against the load concentration which is applied by spring 21 thereat.

By arranging spring 21 to extend rearwardly under fenders 11b, a workman opening hood 11 is considerably assisted thereby. However, it is to be appreciated that the susbtantial moment of spring 21 eliminates the necessity to use much stronger materials than the lightweight glass fiber or plastic construction shown which would otherwise be necessary to absorb high load concentrations of a spring means without the large moment.

Thus, it can be seen and readily appreciated that spring support 21 relieves to a considerable degree the stresses and destructive forces acting upon a hood member 11 to permit the use of advantageous hood materials and less bulky hinge mountings.

While there have been shown, described and pointed out the fundamental novel features of the invention as applied to the preferred embodiment, it will be understood that various omissions, substitutions and changes in the form and detail of the device illustrated and in the operation can be made by those skilled in the art without departing from the spirit of the invention. For example, while it is preferred to have the spring anchored substantially in the axis of the bumper, the spring could be anchored to extend forward from a rear mounting bracket. It is the intention, therefore, to be limited only as indicated by the scope of the following claims.

I claim:

1. In an automotive vehicle having a body construction including a hood member, means hinging the hood member to the vehicle body to move about an axis disposed transversely of said vehicle from a first position wherein said hood member covers an interior portion of said vehicle to a second position tilted away from said vehicle and exposing said interior portion, support means for said hood member, said support means including at least one leaf spring anchored at one end to a portion of the vehicle fixed relative to the frame, with the other end free, the anchored end being disposed nearest said axis, a first fixed member extending laterally of said spring and serving to anchor said one end, a second fixed member extending generally parallel to said first member and spaced longitudinally of said spring relatively near said first member, said spring being disposed wherein with said hood member in said first position, said second member provides a fixed stop in back of said spring across which said leaf spring bends, the free end of said spring extending to terminate in a position removed from said axis and substantially centrally of said hood member, said leaf spring being disposed to apply an upward lifting bias to said hood member when in the first position, and means anchoring said hood member to said vehicle and acting in a direction opposed to said bias.

2. The invention according to claim 1 wherein said support means includes a pair of said leaf springs, and a said first and second member associated with the anchored end of each.

3. The invention according to claim 1 wherein the upward lifting bias is slightly less than the weight of said hood member.

4. The invention according to claim 1 wherein said vehicle includes a rigid front bumper and hinge members carried by said bumper and supporting said hood member and mounted to said vehicle to dispose said axis immediately to the rear of said bumper.

5. In an automative vehicle having a tiltable body construction including a hood member, means hinging the hood member to the vehicle body to move about an axis disposed transversely of said vehicle from a first position wherein said hood member covers an interior portion of said vehicle to a second position tilted away from said vehicle and exposing said interior portion, support means for said hood member when in said first position, said support means including at least one leaf spring anchored at one end to a portion of the vehicle fixed relative to the frame, said anchored end being disposed substantially in said axis, the other end being free and, with said hood in said first position, the free end of said spring extending to terminate susbtantially in a plane transversely of said vehicle near the center of gravity of said hood member, a first member extending laterally of said spring and serving to anchor said one end, a second member fixed with respect to said first member and extending generally parallel to said first member and spaced longitudinally of said spring relatively near said first member, said leaf spring being disposed to be bent backwardly across said second member by disposing said hood member in said first position to apply an upward bias to said hood member, and means anchoring said hood member to said vehicle and acting in a direction opposed to said bias.

6. A tiltable automative vehicular body construction including a bumper, hinge means mounted adjacent said bumper, a vehicular body portion coupled to said hinge means and mounted for rotation about an axis through said hinge means to be moved from a first position enclosing a substantial portion of the interior of said vehicle to a second position exposing said interior portion, leaf spring means supported from said bumper and disposed substantially coaxially of said hinge means axis, said leaf spring means being disposed, when unstressed, to stand upright from its mounting, said leaf spring means being disposed to be bent under said body portion when the latter is in said first position, the distal end of said leaf spring, when so bent, terminating in a vertical plane transversely of said body portion, said plane being disposed near the center of gravity of said body portion, and means for anchoring said body portion in said first position whereby said leaf spring means relieves a substantial amount of the body portion weight from said anchor means and said hinge means.

7. The invention according to claim 6 further including a wear absorbing pad interposed between said distal end and the underside of said body portion and extending there along sufficiently to take substantially all contact between said distal end and said under side, and wherein said leaf spring means includes a pair of leaf springs.

8. The invention according to claim 7 wherein said springs exert a biasing force against said body portion in said first position substantially matched to and opposing the weight of said body portion.

9. The invention according to claim 8 wherein said hinge means comprises a resilient member formed as an inverted question mark having an annular portion and a stem, and hinged for rotation about an axis running through the end of said member adjacent the annular portion and disposed with respect to said bumper to cause said bumper to arrest the forward tilt of the hood member by contact with the annular portion to provide a safety stop for said hood member, said stem portion being secured to and resiliently supporting said hood member.

References Cited in the file of this patent

UNITED STATES PATENTS

| | | |
|---|---|---|
| 1,598,868 | Lundelius | Sept. 7, 1926 |
| 1,681,188 | Kupfer | Aug. 21, 1928 |
| 2,188,891 | Haltenberger | Jan. 30, 1940 |
| 2,740,487 | Murty et al. | Apr. 3, 1956 |
| 3,017,944 | Norrie | Jan. 23, 1962 |

FOREIGN PATENTS

| | | |
|---|---|---|
| 130,244 | Great Britain | July 31, 1919 |
| 729,593 | Great Britain | May 11, 1955 |